(12) United States Patent
Couilleaux et al.

(10) Patent No.: US 10,054,049 B2
(45) Date of Patent: Aug. 21, 2018

(54) AIR GUIDANCE DEVICE FOR A TURBOMACHINE WITH GROOVES TO MAINTAIN BOUNDARY LAYER

(71) Applicant: SAFRAN AIRCRAFT ENGINES, Paris (FR)

(72) Inventors: Alexandre Gérard François Couilleaux, Morsang sur Orge (FR); Romain Jean-Claude Ferrier, Roissy en Brie (FR); Nicolas Joseph Sirvin, Brunoy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/323,602

(22) PCT Filed: Jul. 2, 2015

(86) PCT No.: PCT/FR2015/051844
§ 371 (c)(1),
(2) Date: Jan. 3, 2017

(87) PCT Pub. No.: WO2016/001602
PCT Pub. Date: Jan. 7, 2016

(65) Prior Publication Data
US 2017/0138260 A1    May 18, 2017

(30) Foreign Application Priority Data

Jul. 3, 2014   (FR) ...................................... 14 56407

(51) Int. Cl.
*F02C 1/00* (2006.01)
*F02C 7/04* (2006.01)
*B64D 33/02* (2006.01)

(52) U.S. Cl.
CPC ........ *F02C 7/04* (2013.01); *B64D 2033/0226* (2013.01); *F05D 2250/60* (2013.01); *F05D 2270/17* (2013.01)

(58) Field of Classification Search
CPC .... B64D 2033/0226; B64D 2033/0293; F15D 1/002; F15D 1/06; F15D 1/065;
(Continued)

(56) References Cited

U.S. PATENT DOCUMENTS 4,455,045 A * 6/1984 Wheeler ................ B62D 35/00
105/1.2
4,706,910 A   11/1987 Walsh et al.
(Continued)

FOREIGN PATENT DOCUMENTS

DE   3609541 A1 * 9/1987 ............... B63B 1/34
EP   1 942 258 A2   7/2008
(Continued)

OTHER PUBLICATIONS

International Preliminary Report on Patentability and the Written Opinion of the International Searching Authority as issued in International Patent Application No. PCT/FR2015/051844, dated Jan. 3, 2017.
(Continued)

*Primary Examiner* — Gerald L Sung
*Assistant Examiner* — Stephanie Cheng
(74) *Attorney, Agent, or Firm* — Pillsbury Winthrop Shaw Pittman LLP

(57) ABSTRACT

An air guidance device for a turbomachine includes an air supply channel of a turbomachine engine. The supply channel has an upstream section and a downstream section connected together by a diverting section, the upstream section and the diverting section being connected together via an internal elbow and an external elbow. At the internal
(Continued)

elbow, the internal surface has a groove extending longitudinally in the longitudinal direction of the supply channel and the longitudinal edges of which are widened in the direction of the downstream end of the upstream section of the supply channel.

8 Claims, 3 Drawing Sheets

(58) Field of Classification Search
CPC . F15D 1/12; F15D 1/004; F15D 1/005; F15D 1/003; F15D 1/0025; F02C 7/04
USPC ...................................... 244/200.1; 137/15.1
See application file for complete search history.

(56) References Cited

U.S. PATENT DOCUMENTS

| | | | | |
|---|---|---|---|---|
| 5,598,990 | A * | 2/1997 | Farokhi | B64C 23/06 |
| | | | | 244/198 |
| 6,006,823 | A * | 12/1999 | Kiknadze | F15D 1/005 |
| | | | | 165/133 |
| 8,277,194 | B2 * | 10/2012 | Jabado | C23C 24/04 |
| | | | | 416/241 B |
| 8,579,594 | B2 * | 11/2013 | Fuglsang | F01D 5/145 |
| | | | | 416/231 R |
| 9,416,802 | B2 * | 8/2016 | Barrett | F15D 1/003 |
| 2004/0083938 | A1 * | 5/2004 | Olsen | B63B 1/34 |
| | | | | 114/67 R |
| 2008/0156187 | A1 * | 7/2008 | Tingle | F02C 7/052 |
| | | | | 95/22 |
| 2010/0288379 | A1 * | 11/2010 | Dahm | B64C 21/10 |
| | | | | 137/561 R |

FOREIGN PATENT DOCUMENTS

FR        2 951 502 A1    4/2011
WO   WO 2008136697 A1 * 11/2008 ........... B64C 23/005

OTHER PUBLICATIONS

International Search Report as issued in International Patent Application No. PCT/FR2015/051844, dated Nov. 18, 2015.

* cited by examiner

AIR GUIDANCE DEVICE FOR A TURBOMACHINE WITH GROOVES TO MAINTAIN BOUNDARY LAYER

CROSS-REFERENCE TO RELATED APPLICATIONS

This is the U.S. National Stage of PCT/FR2015/051844, filed Jul. 2, 2015, which in turn claims priority to French Application No. 1456407, filed Jul 3, 2014, the entire contents of all applications are incorporated herein by reference in their entireties.

TECHNICAL FIELD OF THE INVENTION

This invention relates to the field of turbomachines for aircraft, and concerns more specifically a turbomachine air guidance device of the type comprising a pair of non-shrouded contra-rotating fans, widely known as "open rotor" as well as aircraft turbo-propeller engines.

STATE OF THE PRIOR ART

The use of one or more air guidance devices is known. These generally take the form of lobes, located circumferentially around the longitudinal axis of a turbomachine.

FIG. 1 shows an example of a turbomachine 1, sometimes called dual lobe, which is in accordance with that described in FR2951502. More particularly, this turbomachine 1 comprises two air guidance devices 2 each of which has an S-shape. These air guidance devices 2 are symmetrical about the longitudinal axis X of the turbine engine 1 and connected to a primary air stream 3 which supplies air to an engine of the turbomachine 1 comprising at least one compressor, a combustion chamber and a turbine.

In general, the main function of an air guidance device is to supply the engine with air in the most homogeneous manner possible. However the significant radial offset of these air guidance devices and the fact that the latter are not axially symmetric induces a distortion in the airflow which passes through them and which is intended to supply the primary airflow of the turbomachine. These distortions result in a considerable loss of efficiency of the engine.

More particularly, an air guidance device 2 has an upstream section 2am which receives a flow of air along a first direction which is then led, via a diverting section 2d, into a downstream section 2av in a second direction. This deviation section 2d may be formed, as in the example, of two successive elbows. The distortion effect is essentially due to delamination occurring at the change of direction between the upstream section 2am and the deviation section 2d. This delamination results in low-pressure zones (represented by the zone Z) which cause significant eddies at the outlet, in other words at the extreme downstream end of the downstream section 2av. The larger the angle of deviation, the greater the delamination causing a large distortion.

DESCRIPTION OF THE INVENTION

The purpose of the invention is therefore to remedy the drawbacks in the state of the art. In this context the aim of the invention is to offer an air guidance device for a turbomachine which decreases the delamination effect.

To this end the invention relates to an air guidance device for a turbomachine comprising an air supply channel of a turbomachine engine, where the supply channel has an upstream section and a downstream section connected together by a diverting section constructed and suitable for leading the received airflow in a first direction coming from the upstream section towards a second direction within the downstream section.

Furthermore the upstream section and the diverting section are connected together by means of an internal elbow and an external elbow. At the internal elbow the internal surface of the air guidance device has a groove which extends longitudinally in the direction of the length of the supply channel.

In addition, the longitudinal edges of the groove are flared in the direction of the downstream end of the upstream section of the supply channel.

In other words this groove is positioned at the location of the change of direction between the upstream section and the diverting section.

It should be noted that the groove locally increases the level of turbulence. This increase in the level of turbulence limits delamination of the boundary layer in the air guidance device and therefore improves its yield and its distortion. In other words, the groove significantly limits delamination in the air guidance device since the velocity at which the airflow moves is reduced by the presence of the groove.

In general the terms "upstream" and "downstream" used in all of the present description are to be regarded as being relative to the direction of movement of the flows.

In a non-restrictive manner, the air-guidance device may be formed by a turbomachine air-entry sleeve of the type comprising a pair of non-shrouded contra-rotating fans commonly known as "open rotor" type, together with aircraft turboprop engines.

In another non-restrictive embodiment, the air guidance device may be formed by a pipe of a compressor assembly.

Furthermore, one benefit of this groove in comparison with a vortex generator (VG) is due to its non-intrusive character in the pipe. It cannot be damaged by external elements (birds, hailstones etc.) entering the engine. On the contrary, vortex generators protrude into the conduit and can be damaged by ingested external elements.

Besides the characteristics which have just been stated in the preceding paragraph, the device according to the invention may exhibit one or more additional characteristics from amongst the following, considered individually or according to technically feasible combinations.

In one non-restrictive embodiment, the upstream width of the groove is between $0.021 \times R$ and $0.082 \times R$, where R is the radius of a circle whose surface area is equal to the inlet cross-section of the upstream section of the supply channel, where the inlet cross-section is located in a plane perpendicular to the longitudinal axis of the upstream section. The term longitudinal axis of the upstream section relates to an axis extending substantially at the centre and in the direction of the length of the upstream section.

In one non-restrictive embodiment, the downstream width of the groove is between $0.021 \times R$ and $0.082 \times R$, where R is the radius of a circle whose surface area is equal to the inlet cross section of the upstream section of the supply channel, where said inlet cross-section is located in a plane perpendicular to the longitudinal axis of the upstream section.

In one non-restrictive embodiment, the length of the groove is between $0.01 \times R$ and $0.21 \times R$, where R is the radius of a circle whose surface area is equal to the inlet cross section of the upstream section of the supply channel, where said inlet cross-section is located in a plane perpendicular to the longitudinal axis of the upstream section.

In one non-restrictive embodiment, the height of the groove is between $0.001 \times R$ and $0.012 \times R$, where R is the radius of a circle whose surface area is equal to the surface area of the inlet cross-section of the upstream section of the supply channel, where said inlet cross-section is located in a plane perpendicular to the longitudinal axis of the upstream section.

In one non-restrictive embodiment, at least a part of the internal surface of the groove has imperfections.

In one non-restrictive embodiment, a part arranged at the upstream end of the internal surface of the groove is smooth.

In one non-restrictive embodiment, the downstream end of the groove forms an angle greater than 90 degrees with the internal surface of the groove. In one non-restrictive embodiment, the air guidance device furthermore comprises a channel for the removal of unwanted objects, said channel for removal of unwanted objects being connected to the downstream end of the upstream section of the supply channel.

BRIEF DESCRIPTION OF THE FIGURES

Other characteristics and advantages of the invention will emerge clearly from the description of it that is given below by way of an indication and which is in no way restrictive, with reference to the appended figures wherein.

In all the figures, common elements carry the same reference numbers.

DETAILED DESCRIPTION OF AT LEAST ONE NON RESTRICTIVE EMBODIMENT OF THE INVENTION

Figure 1:
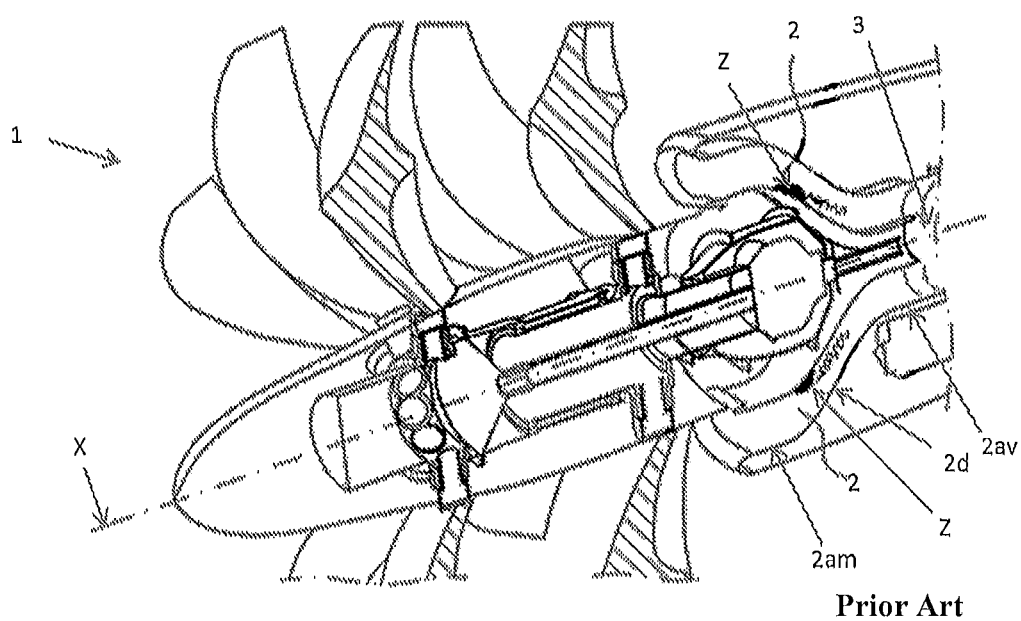
FIG. 1 shows a turbomachine with contra-rotating fans comprising two air guidance devices in accordance with the state of the art.

FIG. 1 has been used to show an air guidance device according to the state of the art.

Figure 2:
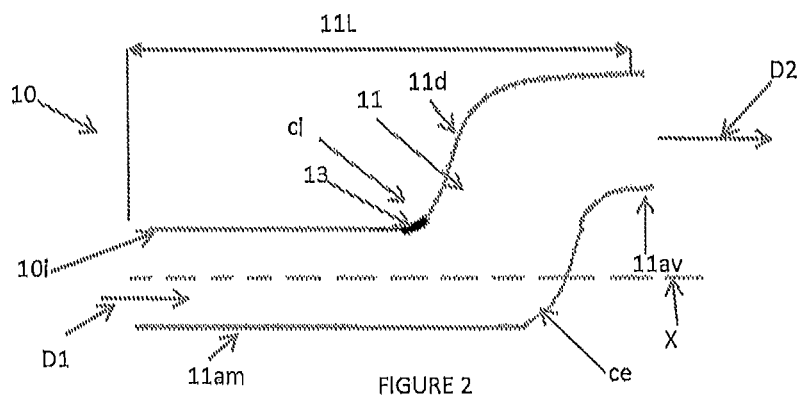
FIG. 2 schematically shows a first example of an air guidance device for a turbomachine which is in accordance with the invention.

FIG. 2 schematically shows an air guidance device 10 for a turbomachine which is in accordance with the invention. This air guidance device 10 comprises an air supply channel 11 for a turbomachine engine.

The supply channel 11 has an upstream section 11am and a downstream section 11av linked together by a section 11d for diverting the airflow. More specifically, the airflow enters the supply channel 11 via the upstream end of the upstream section 11am and is then led in a first direction D1 via the upstream section 11am to the diverting section 11d. The diverting section 11d then leads this airflow to the downstream section 11av of the supply channel 11 within which downstream section 11 ay the airflow moves in a second direction D2.

Furthermore, the upstream section 11am and the diverting section 11d are connected together via an internal elbow Ci and an external elbow Ce. At the internal elbow Ci (that is, at the change of direction where delamination effects normally occur) the internal surface area 10i of the air guidance device 10 has a groove 13 (also called a scoop 13) which extends longitudinally in the direction of the length 11L of the supply channel 11.

The internal surface area 10i corresponds to the surface that is in contact with the movement of the airflows. Furthermore, in comparison with the external elbow Ce, in the example shown the internal elbow Ci corresponds to the elbow with the smallest radius of curvature.

This groove 13 delays the delamination and thus reduces or even eliminates the generation of eddies. This specific feature preserves a homogeneous flow and an optimum pressure at the outlet from the supply channel 11.

In this non-restrictive embodiment, the groove 13 is arranged at the change of direction of the airflow caused by the diverting section 11d.

Figure 3:
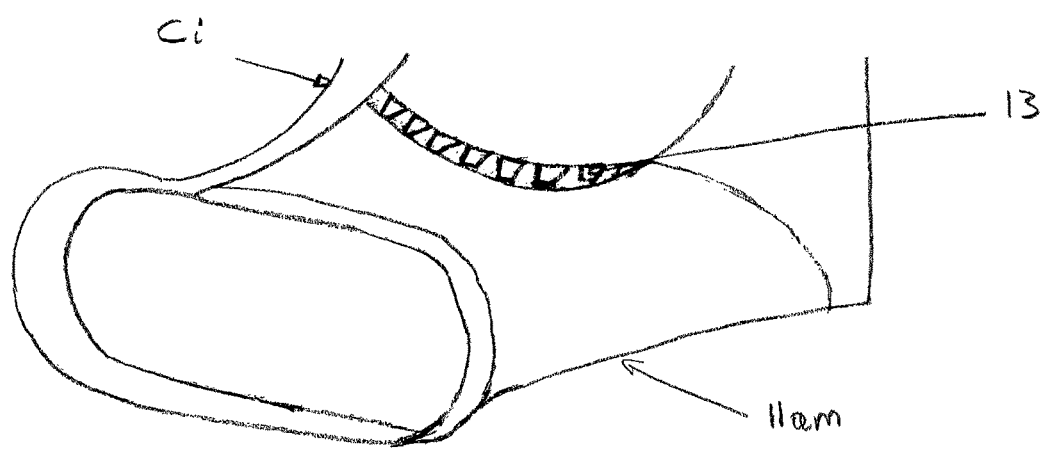
FIG. 3 schematically shows a second example of an air guidance device for a turbomachine which is in accordance with the invention.

FIG. 3 shows a second embodiment example of an air guidance device 10 in accordance with the invention. More specifically FIG. 3 shows the upstream section 11am and the internal elbow Ci of the air guidance device. The presence of a plurality of grooves 13 can also be seen through the transparency.

In effect, in this non-restrictive embodiment the internal surface area 10i of the air guidance device 10 comprises, at the internal elbow Ci, a plurality of grooves 13 which extend longitudinally in the direction of the length of the supply channel. The presence of a plurality of grooves 13 improves the effect consisting of delaying delamination. The movement of the airflows within the air-guidance device is thus homogeneous and the pressure at the outlet from the supply channel 11 is optimised.

Figure 4:
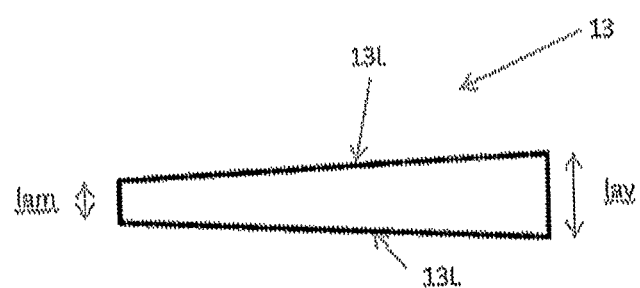
FIG. 4 schematically shows a first non-restrictive example of a groove that an air guidance device according to the invention comprises, FIG. 5 schematically shows a second non-restrictive example of a groove that an air guidance device according to the invention comprises.

FIG. 4 shows a non-restrictive embodiment example of a groove 13 that an air guidance device according to the invention comprises. In this non-restrictive embodiment, the longitudinal edges 13L of the groove 13 are flared in the direction of the downstream end of the upstream section 11am of the supply channel 11. In other words the upstream width lam of the groove 13 is less than the downstream width lay of the groove 13. This form of the divergent groove 13 slows the airflow moving inside the groove 13 and thus locally creates a shear zone which increases the local level of turbulence. This effect is used to delay any downstream delamination effects.

Figure 5:
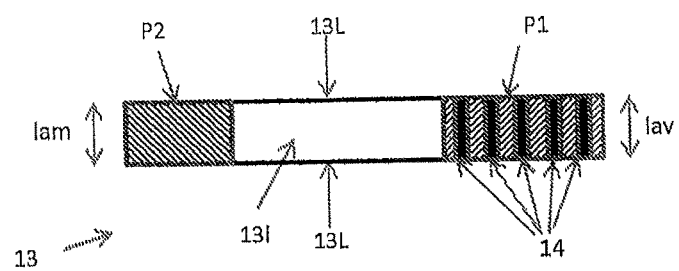

FIG. 5 schematically shows an embodiment example of the internal surface 13i of a groove 13 that a supply channel that is in accordance with the invention comprises.

It can be seen that in this non-restrictive embodiment the longitudinal edges 13L of the groove 13 are parallel to each other.

Furthermore, in this embodiment the internal surface 13i of the groove 13 which corresponds to the surface forming the base of the groove 13 has imperfections 14 at a first section P1. This first section P1 is arranged at the downstream end of the groove 13 and comprises a plurality of slots 14. These slots 14 may be replaced by any other type of imperfection. These imperfections may be made, for example, through roughness of the internal surface 13i or due to the present of spikes.

In this embodiment the internal surface area 13*i* of the groove 13 has a second smooth section P2 whose tolerance may be, for example, +/−0.127 mm. This second smooth section P2 is arranged at the end of the upstream section of the groove 13.

It should be noted that this arrangement of the sections P1 and P2 is in no way restrictive. Thus the internal surface 13*i* may comprise no imperfections, may comprise them at one section, on several sections spaced apart from each other, or over its entire surface. Similarly the internal surface 13*i* may not be smooth, may be smooth over one section, may be smooth over several sections spaced apart from each other, or may be smooth over its entire surface.

In another non-restrictive embodiment that is not shown, the internal surface of the groove 13 may, for example, be rough at its upstream end and at its downstream end.

Figure 6:
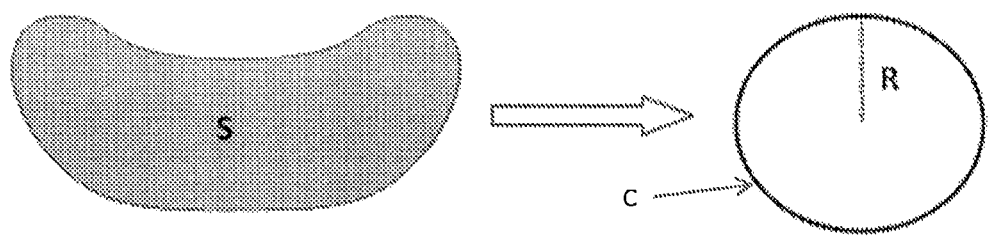
FIG. 6 shows the inlet cross-section of the upstream section of the supply channel in accordance with the invention, FIG. 7 schematically shows the possible dimensions of a groove that an air guidance device according to the invention comprises, FIG. 8 schematically shows a third non-restrictive example of an air guidance device according to the invention.

FIG. 6 shows the inlet cross-section S of the upstream section 11*am* of the supply channel in accordance with the invention. The inlet section S shown is located in a plane perpendicular to the longitudinal axis X of the upstream section 11*am* of the supply channel 11. In this non-restrictive embodiment, the inlet section S has the form of a lobe.

The dimensions of a groove 13 may for example be determined in accordance with a circle C where the surface area of this circle C is equal to the surface area of the inlet cross section area of the upstream section S of the upstream section 11*am* of the supply channel 11.

Figure 7:
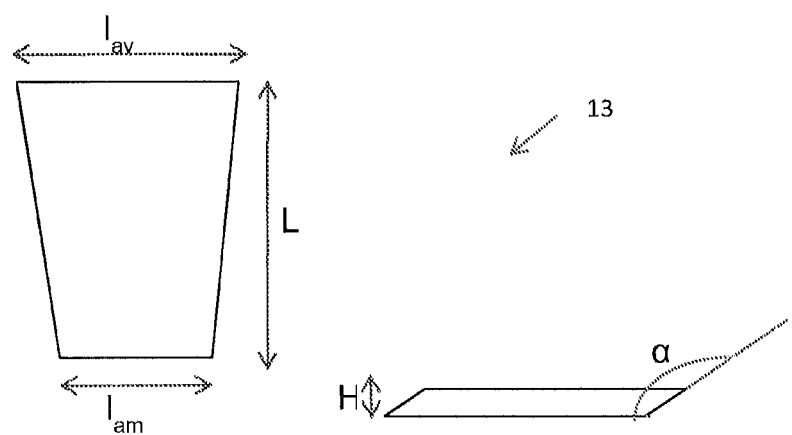

Thus, for example:
- the upstream width Iam (illustrated in FIG. 7) Ia of the groove 13 is between 0.021×R and 0.082×R, where R is the radius of the circle C whose surface area is equal to the surface area of the inlet section S of the upstream section 11*am* of the supply channel 11,
- the downstream width Iay of the groove 13 is between 0.021×R and 0.082×R,
- the groove 13 has a length L of between 0.01×R and 0.21×R,
- the groove 13 has a height H of between 0.001×R and 0.012×R, In this example, the downstream end of the groove 13 forms an angle greater than 90 degrees with the internal surface 13*i* of the groove. Thus the supply channel 11 does not have a surface for stopping the airflow which could create turbulence.

Figure 8:
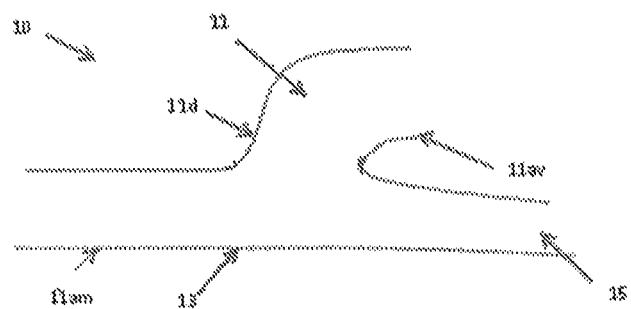

FIG. 8 schematically shows a second non-restrictive example of an air guidance device according to the invention. In this embodiment the air guidance device 10 furthermore comprises a channel 15 for removal of unwanted objects. The channel 15 for removal of the unwanted objects is connected to the downstream end of the upstream section 11*am* of the supply channel 11.

It should be noted that the air guidance device according to the invention is applicable to a turboprop engine comprising an air guidance device, several air guidance devices or with an open rotor.

In other words, the air guidance device 10 is applicable to the following air inlets:
turboprop engine single lobe,
turboprop engine dual lobe, or
open rotor dual lobe.

In general, the dimensions of the supply channel 11 are dependent on the power of the engine as well as on their location. The supply channel dimensions 11 can therefore be varied in accordance with the power of the engine and the location of said supply channel.

The invention claimed is:

1. An air guidance device for a turbomachine comprising a supply channel for supplying air to a turbomachine engine, said supply channel having an upstream section and a downstream section connected together by a diverting section constructed and adapted to lead an airflow received in a first direction coming from said upstream section in a second direction within said downstream section, said upstream section and said diverting section being connected to each other via an internal elbow and an external elbow, at said internal elbow, wherein the internal surface area of the air guidance device has a groove which extends longitudinally in a direction of a length of the supply channel, wherein longitudinal edges of the groove are flared in a direction of a downstream end of the upstream section of the supply channel, wherein the groove has a length between 0.01xR and 0.21xR, where R is a radius of a circle whose surface area is equal to a surface area of an inlet cross-section of the upstream section of the supply channel.

2. The air guidance device according to claim 1, wherein an upstream width of the groove is between 0.021xR and 0.082xR, where R is the radius of the circle whose surface area is equal to the surface area of the inlet cross-section of the upstream section of the supply channel.

3. The air guidance device according to claim 1, wherein a downstream width of the groove is between 0.021xR and 0.082xR, where R is the radius of the circle whose surface area is equal to the surface area of the inlet cross-section of the upstream section of the supply channel.

4. The air guidance device according to claim 1, wherein the groove has a height between 0.001xR and 0.012xR, where R is the radius of the circle whose surface area is equal to the surface area of the inlet cross-section of the upstream section of the supply channel.

5. The air guidance device according to claim 1, wherein at least one section of an internal surface area of the groove has imperfections.

6. The air guidance device according to claim 1, wherein one section arranged at an upstream end of an internal surface area of the groove is smooth.

7. The air guidance device according to claim 1, wherein a downstream end of the groove forms an angle greater than 90 degrees with an internal surface area of the groove.

8. The air guidance device according to claim 1, further comprising a channel for the removal of unwanted objects, said channel for removal of unwanted objects being connected to the downstream end of the upstream section of the supply channel.

* * * * *